United States Patent [19]
Vilches et al.

[11] Patent Number: 5,245,555
[45] Date of Patent: Sep. 14, 1993

[54] SYSTEM FOR MEASURING VECTOR COORDINATES

[76] Inventors: Jose I. Vilches, 13 7th Ave., Passaic, N.J. 07055; Hector Vilches, 353 3rd St., Clifton, N.J. 07011

[21] Appl. No.: 597,855

[22] Filed: Oct. 15, 1990

[51] Int. Cl.$^5$ .............................................. G01B 5/25
[52] U.S. Cl. .................................. 364/559; 33/1 LE; 33/288
[58] Field of Search ............... 364/559, 560, 474.36; 33/1 N, 1 LE, 1 PT, 288, 286, 1 CC, 453, 760, 761, 762, 763

[56] References Cited

U.S. PATENT DOCUMENTS

| | | | |
|---|---|---|---|
| 4,249,314 | 2/1981 | Beck | 33/1 H |
| 4,473,954 | 10/1984 | Vilches | 33/1 LE |
| 4,703,443 | 10/1987 | Moriyasu | 364/559 |
| 4,831,561 | 5/1989 | Utsumi | 364/559 |
| 4,841,460 | 6/1989 | Dewar et al. | 364/559 |
| 4,928,175 | 5/1990 | Haggrén | 364/559 |
| 4,961,155 | 10/1990 | Ozeki et al. | 364/559 |
| 5,193,288 | 3/1993 | Stifnell | 33/608 |

*Primary Examiner*—Thomas G. Black
*Assistant Examiner*—Michael Zanelli
*Attorney, Agent, or Firm*—Melvin K. Silverman

[57] ABSTRACT

A system for measuring coordinates of a vector in x,y,z Cartesian space includes a flexible non-elastic string spirally mounted upon a selectably positively and negatively rotatably tensioned drum, the drum having an axle of rotation and being positively rotatable as a function of positive increments of length of the string. Mounted co-integrally with the drum axle is a translational measurement encoder for converting rotation of the drum axle into a signal output corresponding to positive increments of extension of length of the string. Further provided is an assembly for defining an origin of the vector to be measured, the assembly including an origin member having an aperture therein for slidable accommodation of the string. First and second encoders are provided for measurement of angle-related information to digital electronic computing means which algorithmically derive the x,y,z coordinates of the measured vector from signal outputs corresponding to measured increments of length of the string and to angular movements of the string relative to the Cartesian reference axes.

3 Claims, 7 Drawing Sheets

SYSTEM FOR MEASURING VECTOR COORDINATES

BACKGROUND OF THE INVENTION

There exist numerous manufacturing, medical, and other environments in which it is necessary to accurately measure a plurality of points upon a given surface and to compare such points with those of predetermined standard reference points, vectors and curvatures.

The prior art has, to a degree, addressed the problem of measurement of industrial systems having a natural symmetry as, for example, is reflected in U.S. Pat. Nos. 4,204,333 (1980) to van Blerk, entitled System and Method for Calibrating Wheel Alignment System Sensors; U.S. Pat. No. 4,330,945 (1982) to Eck, entitled Vehicle Frame and Body Alignment Apparatus; and U.S. Pat. No. 4,473,954 (1984) entitled Symmetric Body which is concerned with a gauge for aligning opposite points of and within opposite surfaces of a normally symmetric body such as an automobile.

The prior art further teaches certain, primarily mechanical, point measurement methods as is reflected in U.S. Pat. No. 4,249,314 (1981) to Beck, entitled Diver Operated Bottom Survey System.

The instant invention also may be viewed as an improvement and natural evolution of my earlier said U.S. Pat. No. 4,473,954.

The above and other known prior art is exclusively concerned with measurements of systems having a natural or axisymmetric symmetry.

The instant invention addresses a method which we have discovered for simply and cost-effectively determining the coordinates of any vector in X, Y, Z Cartesian space. As such, the instant invention addresses various long-felt needs in the art for easily, accurately, and cost-effectively measuring the coordinates of one or more vectors to, thereby, effectively measure curves in three dimensional space and, optionally, to compare such vectors and curvatures with predetermined reference values and/or with axisymmetric and conjugate symmetric values of such vectors and curvatures.

SUMMARY OF THE INVENTION

A system for measuring coordinates of a vector in x,y,z Cartesian space, comprises a flexible non-elastic string spirally mounted upon a selectably positively and negatively rotatably tensioned drum, said drum having an axle of rotation and positively rotatable as a function of positive increments of length of said string. Mounted co-integrally with said drum axle is a translational measurement encoder for converting rotation of said axle into a signal output corresponding to positive increments of extension of length of said string. Also provided is means for defining an origin of a vector to be measured, said means including a rigid member having an aperture therein for slidable accommodation about said string. There is also provided first encoder means having a central axle co-linear with a first Cartesian axis of the vector to be measured, said first encoder means further having a radial arm, integral with said axle and projecting radially externally of said encoder means, said arm having a distal end including therein an aperture proportioned for slidable accommodation about said string, in which angular movements of said string, relative to said first Cartesian axis, and against said aperture, will transmit an increment of rotation through said radial arm to said axle thereby inputting such increment to the operation of said encoder means, relative to a null point, to produce signal outputs proportional to said angular movement of said string relative to said first Cartesian axis. Further provided is second encoder means having a central axle rigidly coupled to a common housing with said first encoder means, said central axle oriented normally to said central axle of said first encoder means, said central axle of said second encoder means thereby co-linear with a second Cartesian axis of the vector to be measured, in which angular movement of said string, relative to said second axis, and against said aperture, will transmit an increment of rotation through said housing to said axle of said second encoder means thereby inputting such increment to the operation of said second encoder, relative to a null point, to produce signal outputs proportional to said angular movements of said string relative to said second Cartesian axis. Digital electronic computing means are provided to algorithmically derive the x,y,z coordinates of the measured vector from said signal outputs corresponding to said measured increments of length of said string and said angular movements of said string relative to said first and second Cartesian axes.

It is, accordingly, an object of the present invention to provide a method for the measurement of the coordinates of one or more vectors in X, Y, Z Cartesian space.

It is another object of the present invention to provide a method for comparing such measured coordinates with a set of predetermined reference coordinates.

It is a further object to provide a simplified, reliable, and cost-effective method for aligning opposite points of opposite surfaces of a normally symmetric body.

It is a yet further object of the present invention to provide a method useful in various sheet metal layouts.

It is a still object of the present invention to provide a method useful in jig verification environments.

It is another object to provide a method useful in medical applications for precise measurements of points and curvatures of the human body, relative to reference curvatures and/or relative to conjugate symmetric points upon opposite sides of the body of a patient.

It is a still further object to provide a generalized method of measuring and comparing coordinates of vectors in three dimensional space having generalized application.

The above and yet other objects and advantages of the present invention will become apparent from the hereinafter set forth Brief Description of the Drawings, Detailed Description of the Invention, and Claims appended herewith.

BRIEF DESCRIPTION OF THE INVENTION

DETAILED DESCRIPTION OF THE INVENTION

Figure 1:
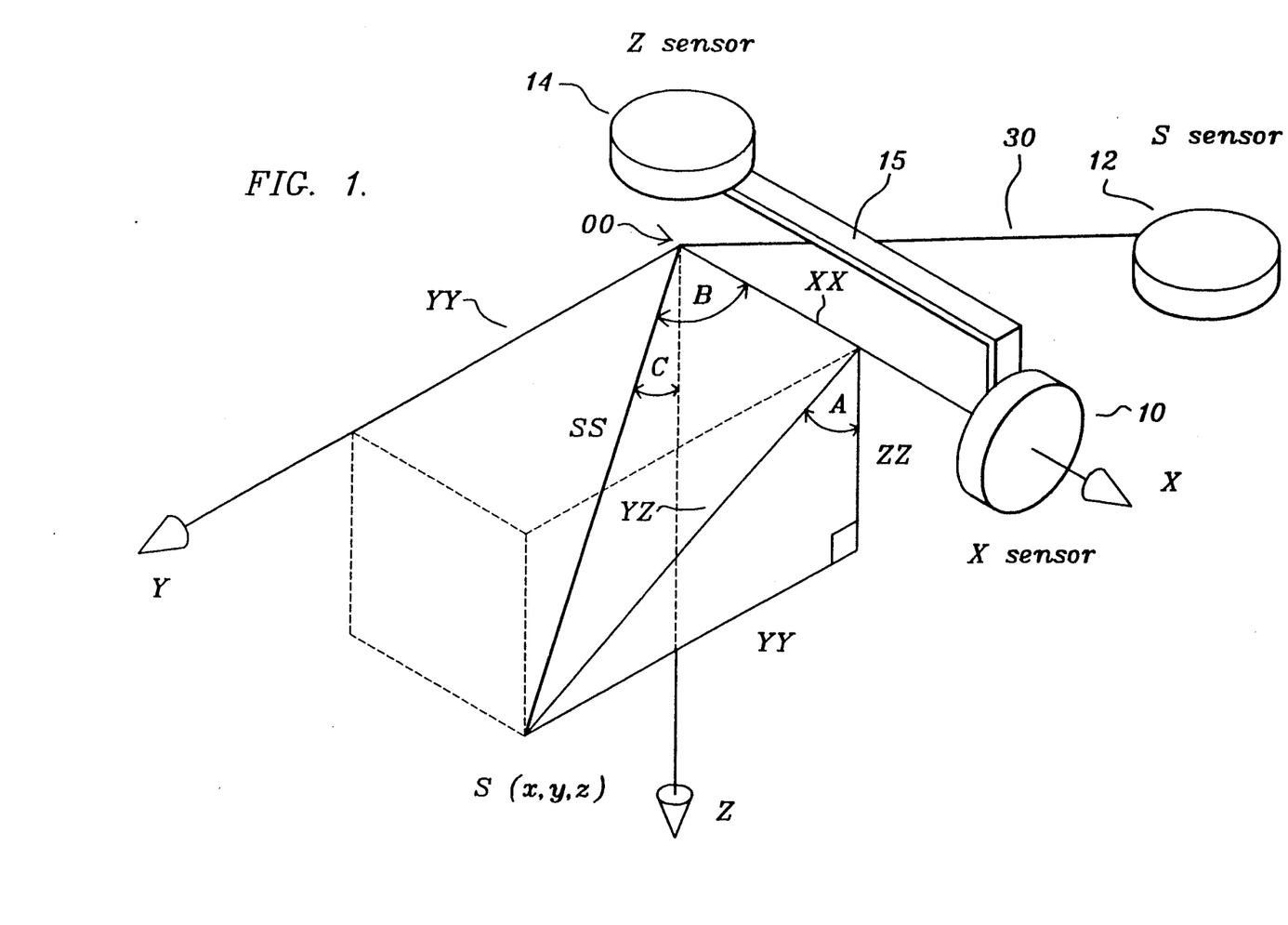
FIG. 1 is a representational view of the hardware and trigonometric relationships utilized in the present inventive method.

With reference to the view of FIG. 1, there is shown therein the X, Y and Z axes of a Cartesian coordinate system. Also shown therein is a vector S having a length SS and having Cartesian coordinates x, y and z. As may be noted, vector S is a three dimensional vector which begins at origin OO of the coordinate system and ends at point (x, y, z) which defines the translational distance SS from origin OO.

Also shown in FIG. 1 is a so-called X-sensor 10, the function of which is to measure the solid angle A between the X-axis and the line defined by vector S. A further sensor, the S-sensor 12, effects the measurement of SS concurrently with the measurement of angle A by the X-sensor 10.

Also shown in FIG. 1 is a Z-sensor 14, the function of which is to measure the angle B that exists between the Z-axis and the line YZ. The S-sensor 12 also operates concurrently with the Z-sensor 14. Further, sensors 10 and 14 are mechanically linked by a L-bracket 15 such that Z-sensor 14 will tilt as a function of the rotation of the X-sensor 10. See FIGS. 2A and 2B. In the absence of the linkage of bracket 15, sensors 10 and 14 would require independent gimbling. In such an approach, Z-sensor 14 would measure an angle C from which, through additional computations, angle A could be derived. Such an approach, it has been found, would add unnecessary cost to the system.

A more particular electro-mechanical implementation of said measurements of angles A and B is later set forth below.

According to the present method, the X-sensor 10 and Z-sensor 14, in association with S-sensor 12, function to measure three parameters, namely, said angles A and B and said length SS of vector S. Once said parameters have been successfully measured, well known trigonometric relationships may be applied to compute the applicable lengths XX, YY, and ZZ along the respective axis to thereby determine the x, y, and z coordinates of vector S.

For example, length XX may be readily determined by multiplying the value of SS by the cosine of angle B. YZ is then derived by taking the sine of angle B multiplied by the length of vector SS. Similarly, the length of ZZ may be readily determined by multiplying the length YZ by the cosine of angle A. Once the lengths YZ and ZZ have been determined, the length YY may be determined by multiplying the length YZ by the sine of angle A or through the use of Pythagoras' Theorem in the relationship $(YY)^2 = (YZ)^2 - (ZZ)^2$. YY may then be solved for. Accordingly, it is to be appreciated that, by simply measuring the angles A and B, and the length SS, the coordinates of any three dimensional vector S may be readily determined.

The present method may be implemented through the use of an electromechanical angle and length measuring device known as an encoder. Encoders have been long known in the art. However, in recent years, they have been improved to the point that applications not previously contemplated can be addressed. More particularly, a device known as an optical encoder is manufactured by Lucas Ledex, Inc. of Vandalia, Ohio 45377, which produces light-sensitive encoders by which an analog light input can be employed to produce a highly accurate digital electronic output.

An optical encoder of the Lucas Ledex type referenced above makes use of an encoded rotating disk mounted upon a precision motor via an internal axle, a LED light source and a photocell.

Figure 2A:
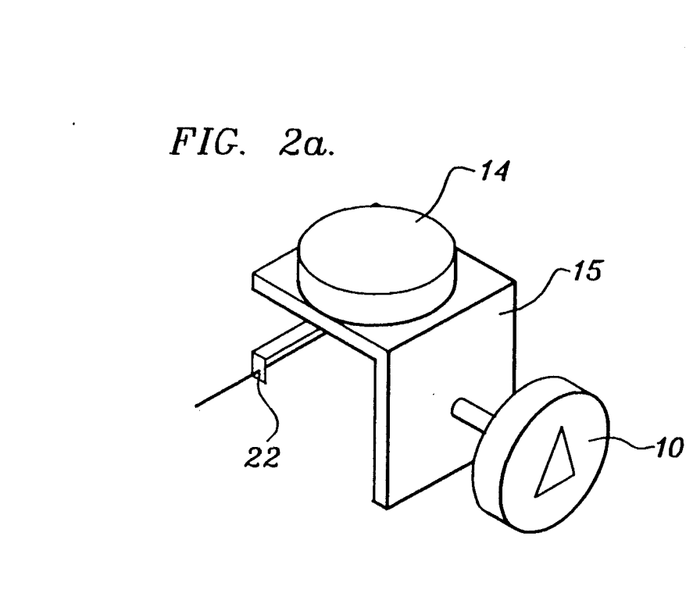
FIGS. 2A and 2B are sequential views showing the operation of the X and Z-axis sensors.
Figure 2B:
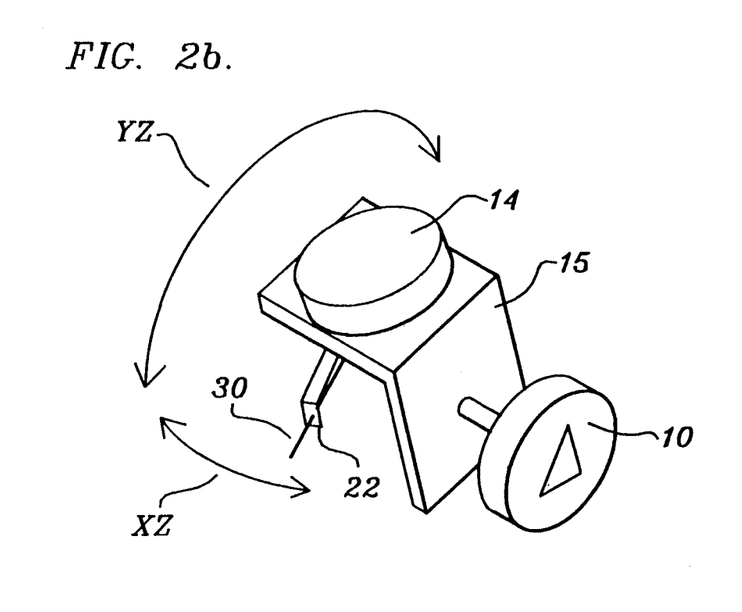
Figure 3:
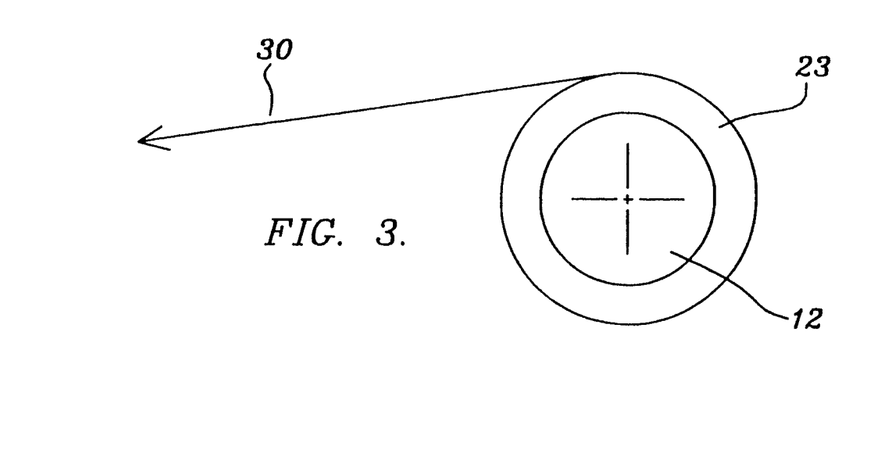
FIG. 3 is a representational view of the relationship of the encoder string to its rotational drum.

The encoder, in the absence of an external optical stimulus, will generate certain standard electronic signal outputs based upon reference rates of rotation of the encoded disk. See representational views of FIGS. 2A and 2B. Shown in FIG. 2A is a the steady state or null condition of the encoders relative to the XZ and YZ Planes. The internal axle of the encoder of sensor 14 is rigidly connected to a rotatable external arm 22. This external arm 22 is rigidly connected to the encoded disk of the encoder such that changes in rotational position of arm 22 are communicated to the encoded disk thereby affecting the quanta of light, that is, the number of photons, that can be received by the photocell. Accordingly, the quanta of light received by the photocell acts as a criteria for measurement of the extent of rotational motion of arm 22 relative to the X and Z-axes of the system.

Figure 4:
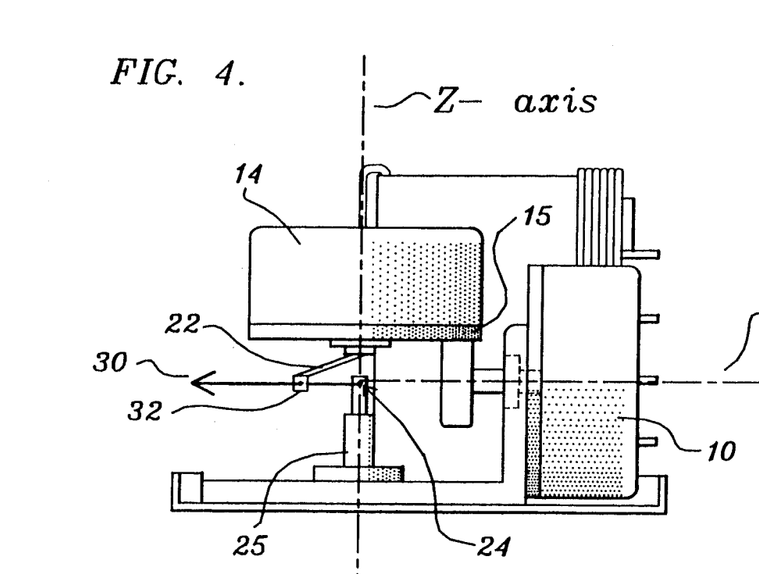
FIG. 4 is an end view of an electro-mechanical embodiment of FIG. 1.
Figure 5:
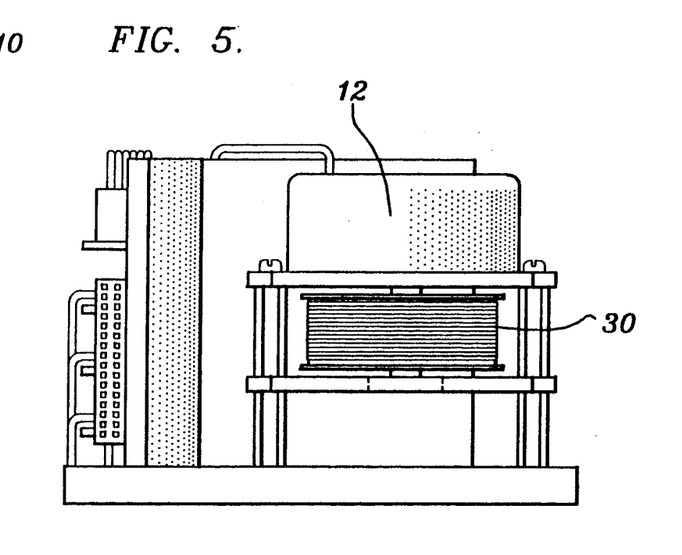
FIG. 5 is an opposite end view of the view of FIG. 4.

As may be noted in FIG. 4, orifice 24 of a member 25 lies in the X and Z-axes and corresponds to the origin OO of the axes defined in FIG. 1. That is, the optical encoder functions to take measurements relative to the X- and Z- axes. In other words, if one wishes to measure an angular displacement, or angle, relative to either axis, it is necessary to so align the mechanical axis of the optical encoder therewith for reference purposes.

It has been found, in the instant application, that an optical encoder of the above Lucas Ledex type will perform in a satisfactory fashion if 45 degrees (one eighth) of a complete physical rotation of the encoder disk is made to correspond to three minutes (1/20 of a degree) of arc of arm 22 of the sensors 10 and 14.

Summarizing the function of the optical encoder, a digital electronic output proportionate to an optomechanically provided angular input will be furnished by sensors 10 and 14. It is noted that a resolver, i.e., a variable reluctance device, may be used in lieu of an encoder to measure angular displacements.

With reference to the view of FIGS. 3 to 6 it is to be appreciated that S-sensor 12 includes a roll 23 of extensible rigid string 30 which, is permitted to unwind concurrently with angle measurements, passing through orifices 24 and 32 of sensor arm 22 and member 25 respectively. As may be noted in FIG. 3, the function of the encoder in S-sensor 12 is substantially similar to the encoder function with regard to the X- and Z-sensors in that, within the string sensor 12, it is only necessary for the encoder to accurately measure the number of drum rotations, including any fractional rotations, to compute the length to which string 30 has been extended in the direction indicated by the arrow at the end of string 30 in FIGS. 3 and 7.

It is to be appreciated that string 30 passes through coordinate axis origin OO (orifice 24 of FIG. 4) whether measurements are being taken with the X-sensor 10 or the Z-axis sensor 14.

Figure 6:
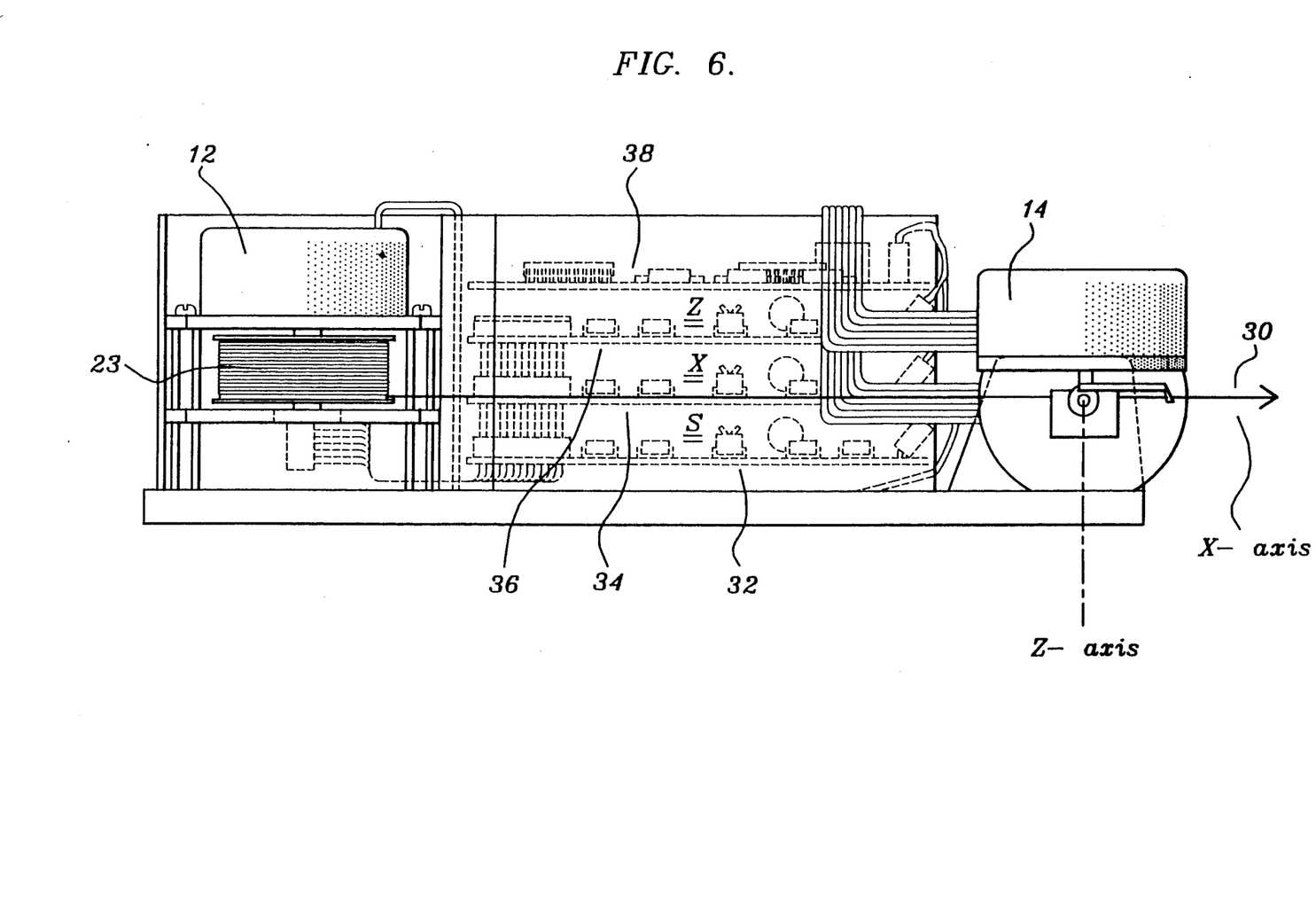
FIG. 6 is a side elevational view of the system.
Figure 7:
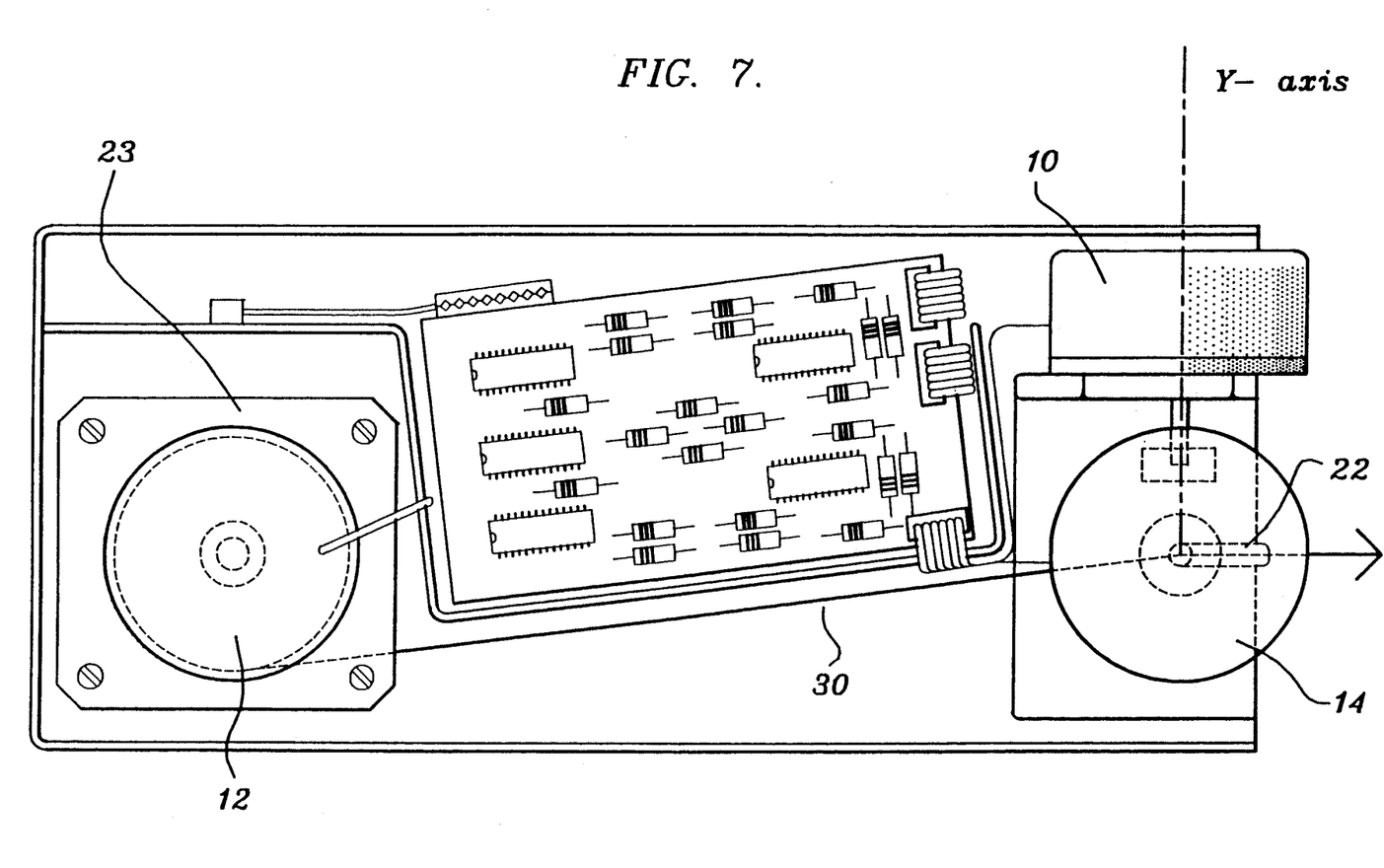
FIG. 7 is a top view of the system.

With reference to the side view of FIG. 6, it is noted that the lowermost integrated circuit board 32 operates to store and transfer information relative to the length SS of string 30. The next board 34 stores information relative to angle B, that is, the solid included angle between the X-axis and the vector S, to be measured. Board 36 stores and communicates information in respect to angle A, that is, the solid include angle between the Z-axis and the line YZ. The topmost integrated circuit board 38 (see FIG. 7) operates as a buffer such that information may flow to a computer in a manner that will permit it efficient use.

Figure 8:
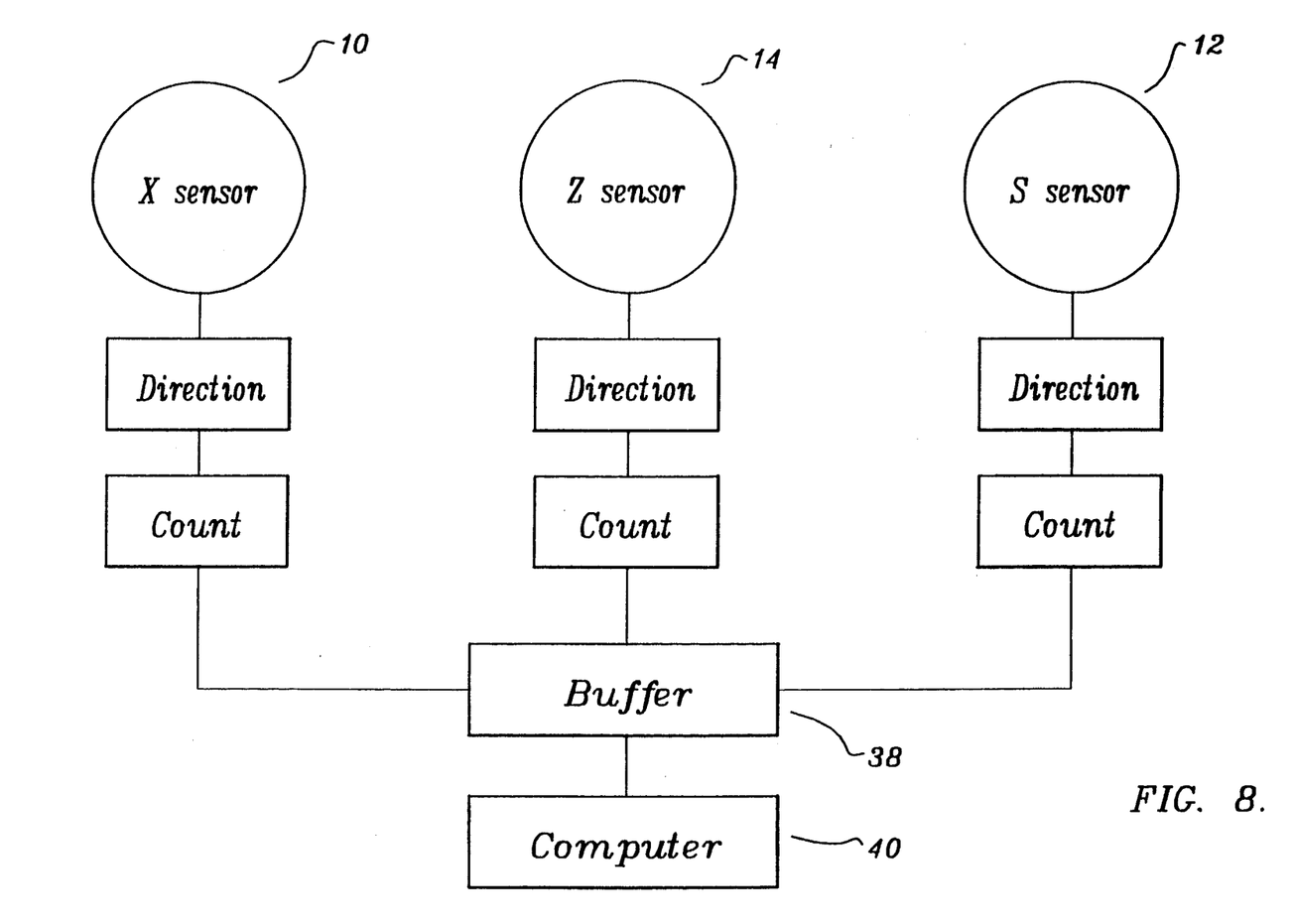
FIG. 8 is an information flow diagram reflective of the inventive method.

The information flow associated with the system is shown in FIG. 8. Therefrom, it may be seen that information flows (counts), with directional information from the three sensors, to a buffer 38 and, therefrom, to a computer 40. In the computer, the above described trigonometric derivations of the x, y, and z coordinates of the S-vector are accomplished based upon the measurements of angles A and B and the length SS.

In a typical application, it is necessary to measure many points on a surface; therefore, many vectors will be measured. Further, in many applications it is also necessary to compare the points upon a curved surface with various references of symmetric or conjugate sets of points. It has been found that this can be more effectively done where the user employs a monitor 42 (see FIG. 9) such that various measurements can, in real time, can be compared with such reference or conjugate symmetric sets of points. The entire apparatus shown in FIGS. 3 to 6 appears in the solid rectangle 44 at the left side of FIG. 9.

Figures 9, 10:
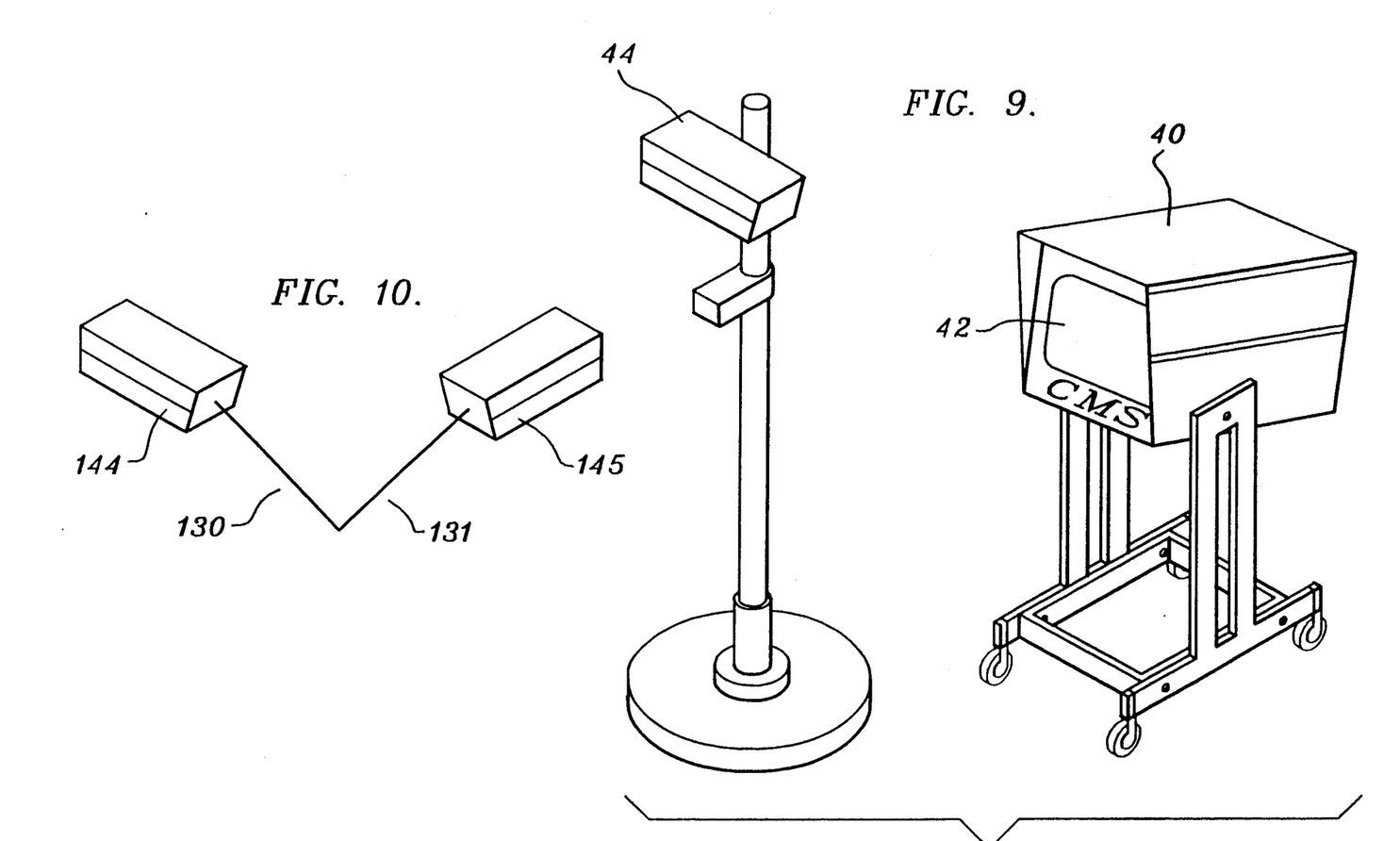
FIG. 9 is a perspective view showing the sensor assembly mounted on a pole, with a computer for use by an operator.
FIG. 10 is a schematic view of a second embodiment of the present invention.

In FIG. 10 is shown, in schematic form, as second embodiment of the invention in which two sets of three sensors 144 and 145 having respective strings 130 and 131 are employed. In this approach one measures two lengths and one angle, as opposed to one length SS and two angles. Thereafter, conventional trigonometric relationships may be used to solve for the x, y, z coordinates of vector S.

It is to be appreciated that the applications of the inventive method are not limited to use upon symmetrical or axisymmetrical surfaces.

Accordingly, while there has been shown and described the preferred embodiment of the present invention is to be appreciated that the invention may be embodied otherwise than is herein specifically shown and described and that, within such embodiments certain changes may be made within detail and construction thereof without the parting from the underlying idea of this invention within the scope of the claims appended herewith.

Having thus described our invention, what we claim as new, useful and nonobvious and, accordingly, secure by Letters of Patent of the United States of America is:

1. A system for measuring coordinates of a vector in x,y,z Cartesian space, comprising:
   (a) a flexible non-elastic string spirally mounted upon a selectably positively and negatively rotatably tensioned drum, said drum having an axle of rotation and positively rotatable as a function of positive increments of length of said string;
   (b) mounted co-integrally with said drum axle, a translational measurement encoder for converting rotation of said axle into a signal output corresponding to positive increments of extension of length of said string;
   (c) means for defining an origin of a vector to be measured, said means including a rigid member having an aperture therein for slidable accommodation about said string;
   (d) first encoder means having a central axle co-linear with a first Cartesian axis of the vector to be measured, said first encoder means further having a radial arm, integral with said axle and projecting radially externally of said encoder means, said arm having a distal end including therein an aperture proportioned for slidable accommodation about said string, in which angular movements of said string, relative to said first Cartesian axis, and against said aperture, will transmit an increment of rotation through said radial arm to said axle thereby inputting to the operation of said encoder means, relative to a null point, to produce signal outputs proportional to said angular movement of said string relative to said first Cartesian axis;
   (e) second encoder means having a central axle rigidly coupled to a common housing with said first encoder means, said central axle oriented normally to said central axle of said first encoder means, said central axle of said second encoder means thereby co-linear with a second Cartesian axis of the vector to be measured, in which angular movement of said string, relative to said second axis, and against said aperture, will transmit an increment of rotation through said housing to said axle of said second encoder means thereby inputting to the operation of said second encoder, relative to a null point, to produce signal outputs proportional to said angular movements of said string relative to said second Cartesian axis; and
   (f) digital electronic means for algorithmically deriving the x,y,z coordinates of the measured vector from said signal outputs corresponding to said measured increments of length of said string and said angular movements of said string relative to said first and second Cartesian axes.

2. The system as recited in claim 1, in which said translational measurement encoder and said first and second encoding means each comprise optical encoders.

3. The system as recited in claim 1, in which said translational measurement encoder and said first and second encoding means each comprise variable reluctance resolvers.

* * * * *